United States Patent [19]
Weinguni

[11] 3,896,983
[45] July 29, 1975

[54] GUIDING SYSTEM FOR A STRIP OF MATERIAL PASSING THROUGH A MACHINE WHICH PROCESSES THE STRIP

[75] Inventor: Othmar Weinguni, Renens, Switzerland

[73] Assignee: J. Bobst & Fils S.A., Switzerland

[22] Filed: Mar. 4, 1974

[21] Appl. No.: 447,858

[30] Foreign Application Priority Data
Mar. 9, 1973   Switzerland.................... 3474/73

[52] U.S. Cl.............................. 226/198; 226/199
[51] Int. Cl............................................ B65h 23/32
[58] Field of Search .............. 226/198, 199; 242/76; 83/444, 446, 448, 449

[56] References Cited
UNITED STATES PATENTS

| | | | |
|---|---|---|---|
| 1,700,099 | 1/1929 | Shively.............................. | 226/199 |
| 2,595,325 | 5/1952 | Baumgartner................. | 226/199 X |
| 2,612,914 | 10/1952 | Reynolds......................... | 83/449 X |
| 3,163,343 | 12/1964 | Zernov............................... | 226/199 |
| 3,640,481 | 2/1972 | Pugh............................. | 226/199 X |
| 3,692,223 | 9/1972 | Laigle ............................... | 226/199 |

*Primary Examiner*—Richard A. Schacher
*Attorney, Agent, or Firm*—Hill, Gross, Simpson, Van Santen, Steadman, Chiara & Simpson

[57]   ABSTRACT

A guiding system for a strip of material, such as cardboard or plastic, passing through a machine which processes the strip and having at least one work station, for example a cutting station, fitted with a lower bed and an upper platen carrying tool holder plates between which the strip is processed, employes at least two laterally adjustable guides arranged between the tool holders and extending substantially the length of the platen in the direction of strip movement. At least one of the guides is resiliently mounted for momentary lateral movement, both of the guides being mounted for independent lateral positioning and coupled together for mutual lateral positioning.

11 Claims, 6 Drawing Figures

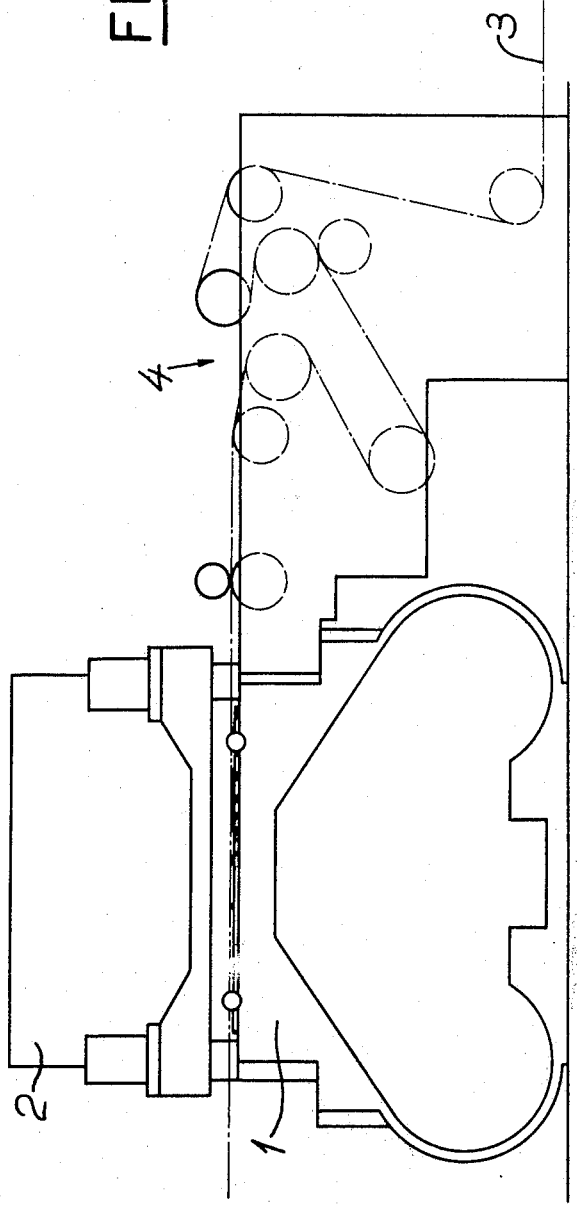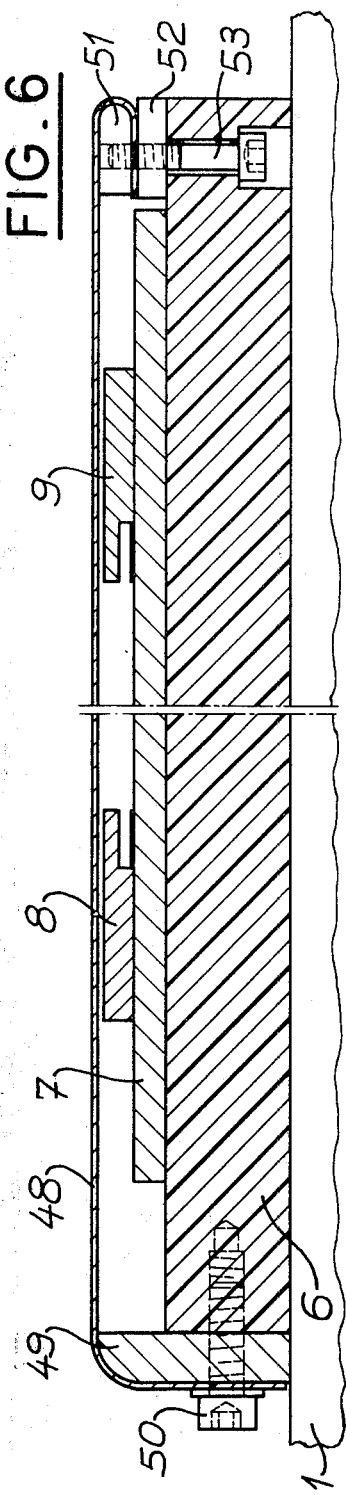

PATENTED JUL 29 1975     SHEET 3     3,896,983

3,896,983

GUIDING SYSTEM FOR A STRIP OF MATERIAL PASSING THROUGH A MACHINE WHICH PROCESSES THE STRIP

BACKGROUND OF THE INVENTION

1. Field of the Invention

This invention relates to a guiding system for a strip of material, such as cardboard or plastic of light thickness, which passes through a machine and is processed by the machine, and is more particularly concerned to a guiding system in such a machine which has at least one work station, for example a cutting station, having a lower bed and an upper platen carrying tool holder plates between which the strip is processed.

2. Description of the Prior Art

Generally machines of the aforementioned type for processing cardboard or similar strips comprise a strip unrolling station, a printing station, a cutting station and, finally, a receiving station. The strip being processed must be accurately guided, particularly at the cutting station, and it is at this point of operation that the invention is particularly advantageous.

In machines of this type known in the prior art, the strip guiding system consists of a table fitted at the feed-in end of the cutting station, i.e. ahead of the two tool holder plates provided at the cutting station. Two guides are provided and fitted on this table, the guides being adjustable laterally in accordance with the width of the strip where the strip passes through. If the strip is correctly guided up to the platen feed-in, i.e. up to the cutting station, it is, to the contrary, no longer guided between the tool holder plates at this station. In particular, it is not possible to provide an angular displacement to the strip between the cutting platen feed-in and feed-out points. Such an angular displacement is often necessary due to the fact that in this type of machine the first half of the platen is used for one operation, such as puckering, and the other half of the machine for a second operation, such as cutting.

SUMMARY OF THE INVENTION

The primary object of the present invention is to provide for and ensure strip guidance throughout the entire length of strip passage through the cutting station in a machine of the aforementioned type in such a way that the strip has positive lateral positioning in the cutting station at all times.

In achieving this object a guiding system constructed according to the present invention comprises at least two adjustable lateral guides arranged between the tool holder plates and extending substantially the length of the platen as measured in the direction of strip movement. More specifically, the laterally adjustable guides are provided with guide support structures which provide independent adjustment of at least one of the guides and mutual adjustment of both of the guides.

The guide system further includes a pair of spaced transversely oriented guides, in the form of metal strips under tension, which prevent vertical distortion of the strip, as may occur, for example, when the platen moves away from the bed.

BRIEF DESCRIPTION OF THE DRAWINGS

Other objects, features and advantages of the invention, its organization, construction and operation will be best understood from the following detailed description of a preferred embodiment of the invention, taken in conjunction with the accompanying drawings, on which:

FIG. 1 is a diagrammatic outline, in elevation, of a typical known cutting station;

FIG. 6 is a sectional view of the apparatus of FIG. 2 taken generally along the line VI-VI.

DESCRIPTION OF THE PREFERRED EMBODIMENT

Figure 5:
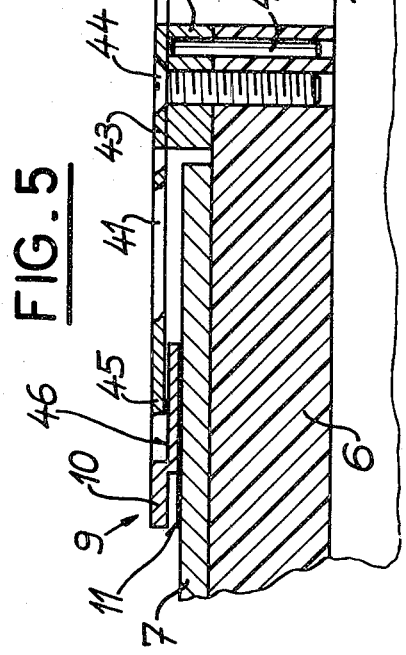
FIG. 5 is a detailed sectional view of a portion of the apparatus of FIG. 2 taken generally along the parting line V-V.

Referring first to FIG. 1, a cutting station is diagrammatically illustrated as comprising, as is well known in the art, a fixed bed 1 and a moving top platen 2. A strip of cardboard 3, or similar material, is fed between the fixed bed 1 and the top platen 2 by means of a feed system 4. The guiding system which will be described hereinafter, and which is constructed according to the present invention, is carried on a tool holder plate 7, as shown in FIGS. 2, 3 and 5.

Figure 2:
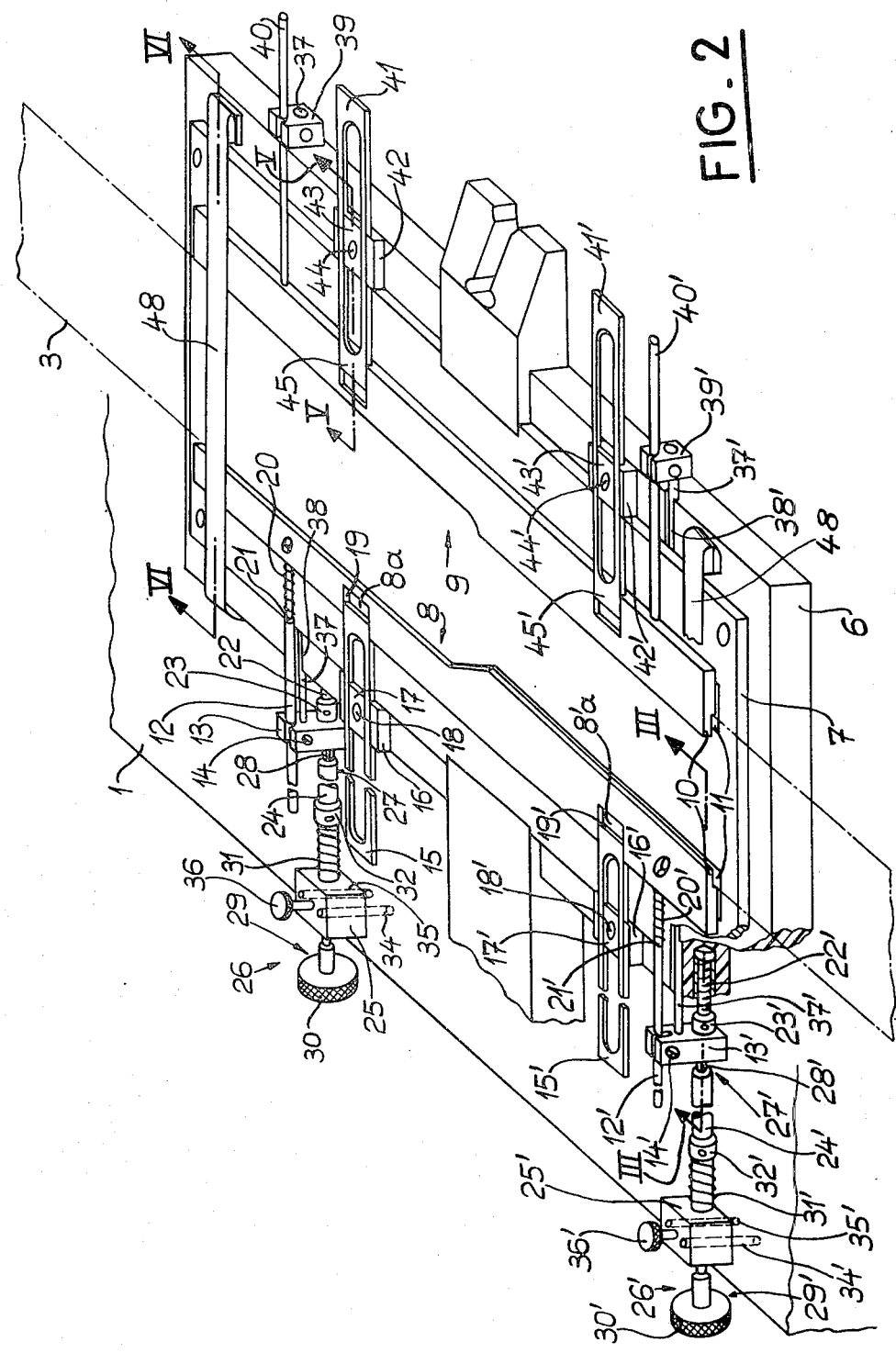
FIG. 2 is a perspective view of the guiding system of the present invention, illustrated with the upper platen removed.
Figure 3:
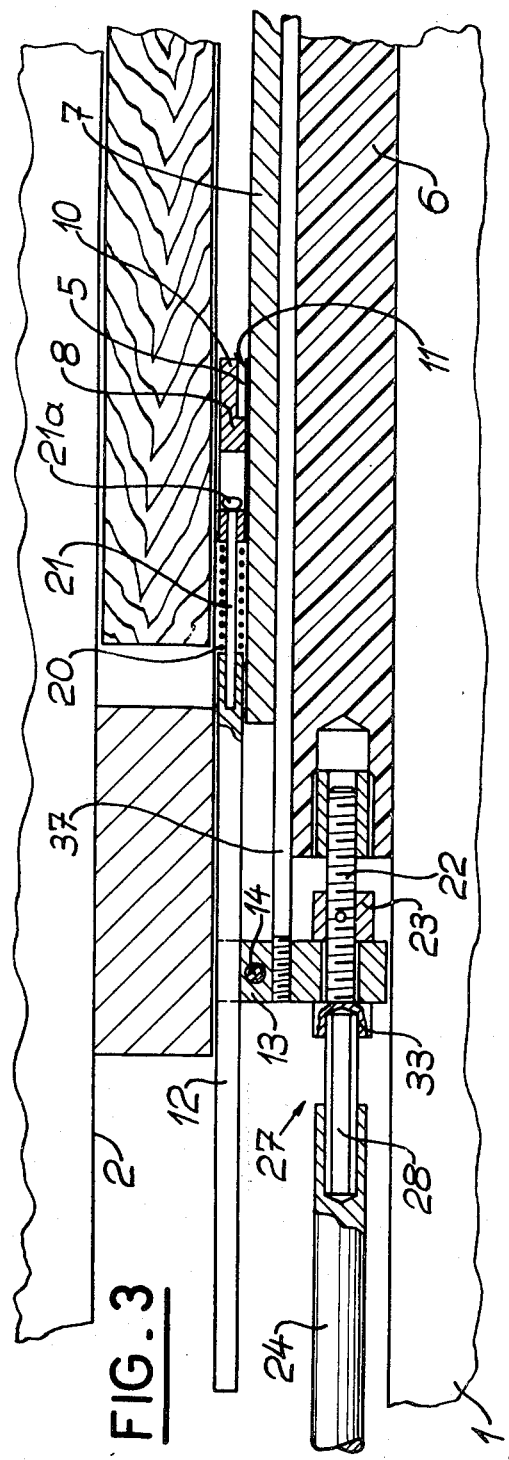
FIG. 3 is a detailed cross sectional view of a portion of the apparatus of FIG. 2 taken generally along the parting line III-III.

The guiding system is shown in the prespective view illustrated in FIG. 2. Essentially the guiding system comprises two adjustable guides including one movable guide 8 and one fixed guide 9 arranged laterally and opposite each other on the steel tool holder plate 7 which is mounted on a plate of synthetic material 6 secured to the lower fixed bed 1 by suitable means (not shown).

The guides 8 and 9 are constructed of two flat superposed components, a lower component 11 being relatively thin in comparison with the upper component 10 (also see FIG. 3), and constructed in such a way that portions thereof define a space 5 which receives the edge of the cardboard strip 3 as it moves through the machine. The lateral movable guide 8 is resiliently coupled to two rods 12 and 12' by means of two rods 21 and 21' fixed to the ends of the rods 12 and 12' and having heads 21 and 21a, respectively, by which the guide 8 is held in such a manner that it is unable to slide along toward the guide 9, i.e. to the right in FIG. 3. The resiliency is provided by a pair of springs 20 and 20' operating in compression between the ends of the rods 12 and 12' and the end face of the movable guide 8. The rods 12 and 12' are fitted in respective supports 13 and 13'. Each of the supports include a top face which is slotted to form a clamp which may be tightened by means of a screw 14 and 14', respectively, thereby enabling the rods 12 and 12' to be held tight in their supports or, on the contrary, to be allowed to slide through the supports. As the rods 12 and 12' are of comparatively small cross section, it is advisable to prevent these rods from bending when they are under transverse stresses due to the rubbing of the cardboard strip between the guides. For this purpose, the movable guide 8 is steadied by two blades 15 and 15' which are adapted to slide transversely across respective blocks 16 and 16' in which the blades can be tightened by means of respective plates 17 and 17' and secured by respective screws 18 and 18'. The blades 15 and 15' have respective ends 19 and 19' which are received in respective rectangular slots 8a and 8'a in the guide 8, the slots having a width and depth which match the width and thickness of the blades 19 and 19' so that the guide 8 is held both laterally as well as vertically against the tool holder 7. Sufficient clearance, however, is provided to allow the guide 8 to slide laterally by compressing the springs 20 and 20'.

The fixed guide 9 is assembled in the same manner as the movable guide 8. The only difference between the two structures is that the fixed guide 9 is rigid in its connection with its supports 39 and 39', through the intermediary of a pair of rods 40 and 40'.

The support 39 of the fixed guide 9 is connected to the support 13 of the movable guide 8 by a tie rod 37, as illustrated in FIGS. 2 and 3, whereas the support 39' is connected to the support 13' by a tie rod 37'. The tie rods 37 and 37' pass through respective grooves 38 and 38' in the plate 6 beneath the tool holder plate 7. This construction provides for mutual lateral movement of the guides 8 and 9. The position of the guide 9 is ensured in the same way as that of the movable guide 8, by means of a pair of blades 40 and 41', similar to the blades 15 and 15', fixed to a pair of blocks 42 and 42' by a pair of plates 43 and 43' and a pair of screws 44 and 44', respectively, as illustrated in FIG. 5.

In FIG. 5, the block 42 is positioned by means of a dowel pin 47 in the plate 6. A clearance of, for example approximately 0.05 mm, is provided between the bottom face of the end 45 of the blade 41 and a slotted face 46 of the guide 9 in which the blade engages, thereby allowing the guide 9 to slide easily on the blade 41. The same structure is provided for the blade 41'. This clearance is provided by suitably machining the height of the blocks 42 and 42'. An identical clearance is provided between the ends 19 and 19' on the blades 15 and 15' and the slots 8a and 8'a. The blocks 39 and 39' are also made in the form of clamps in which the rods 40 and 40' integrally connected with the guide 9, are tightly secured. The rods 40 and 40' can therefore be moved in relation to their blocks 39 and 39' upon loosening of the clamps.

Referring again to FIG. 2, and in particular to the left hand part thereof, the two blocks 13 and 13' can be moved laterally by means of two female hexagon head self-locking screws 22 and 22'. A stop sleeve 23, and a corresponding stop sleeve 23', ensures the position of the screws 22 and 22' in relation to the blocks 13 and 13' (FIG. 3). A detachable adjustment device 26, and a corresponding device 26', is constructed in such a way that the screw 22, and the corresponding screw 22', may be turned by means of the female hexagon head 33 in the screw 22, and by corresponding structure in the screw 22'.

Figure 4:
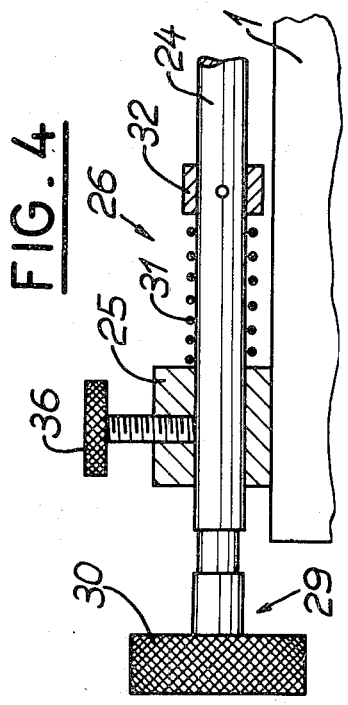
FIG. 4 is a detailed illustration of apparatus for adjusting the lateral guides.

The detachable adjustment device 26 (FIG. 4) comprises a spindle 24 having an end 27 which is inserted in a prismatic hexagon bar 28 designed to enter the screw head 33. The spindle 24 also includes an end 29 which is fitted with a knurled knob 30, and a compression spring 31 is carried about the spindle 24 between the block 25 and the stop sleeve 32 in such a manner as to ensure the engagement of the prismatic bar 28 in the screw head 33. When an adjusting operation is to be made, the block 25 is held in place and positioned on the bed 1 by means of two dowels 34 and 35 which are inserted into corresponding holes drilled in the bed. A knurled knob 36 enables the spindle to be immobilized. The adjusting device 26' is constructed identically.

As the block 13 is connected to the block 39 by the tie rod 37, any movement of the block 13 will cause a like movement of the block 39 as long as the rods 12 and 40 are tightened by the clamping slots in their respective blocks 13 and 39. The same is true for the blocks 13' and 39'.

The guides 8 and 9 can be individually adjusted to suit the width of the strip to be processed. With the object of ensuring accurate lateral marking and, if required, an offset between platen feed-in and feed-out, fine adjustment is provided by means of the adjusting devices 26 and 26'. The cardboard strip can vary in width, without necessarily leading to a blockage or inadvertent slowing down of the strip in that the guide 8 is movable on the rods 12 and 12' so as to follow any variations in width by compressing the springs 20 and 20'.

Under the effect of lateral pressure on the cardboard strip exerted by the guides 8 and 9, the strip has a tendency to arch due to its flexibility; this could lead to machine stoppage caused by damage to the strip. A similar arching effect might also occur in some instances due to a vacuum action of the top platen when the latter rises. To remedy this, a vertical guiding device 48 is provided at the machines feed-in and feed-out points, as illustrated in FIGS. 2 and 6. One end of the device 48 is fixed to a component 49 whose rounded top end guides the device 48, in the form of a metal band, and supports it at the desired height, the band itself being secured by means of a screw 50 which holds the component 49 to the plate 6 at the same time. The other end of the band 48 is folded over and clamped between two plates 51 and 52, the plates 51 and 52 being secured to the plate 6 by means of a screw 53. The plates 51 and 52 are held while ensuring a tension on the band 48.

As is apparent from FIGS. 2 and 6, the metal bands 48 may be utilized to ensure the vertical location of the guides 8 and 9. In this case, the machining of the blades 15, 15', 41 and 41 and the slotting of the guides 8 and 9, can be simplified.

When the cardboard strip to be processed has a precise and constant width, the system may be simplified by replacing the movable guide 8 by a fixed guide similar to the guide 9.

Although I have described my invention by reference to a particular illustrative embodiment thereof, many changes and modifications of the invention may become apparent to those skilled in the art without departing from the spirit and scope of the invention. I therefore intend to include within the patent warranted hereon all such changes and modifications as may reasonably and properly be included within the scope of my contribution to the art.

I claim:

1. A guiding system for a strip of flexible material passing through a machine which processes the strip and which includes a work station having a lower bed and an upper platen which carry tool holder plates between which the strip is processed and between which the strip may arch vertically, said guiding system comprising:

a first laterally adjustable guide between the tool holders;

a second laterally adjustable guide between the tool holders, spaced from and parallel to said first laterally adjustable guide, said first and second guides receiving the strip therebetween and extending substantially the length of the platen in the direction of strip movement;

first support means mounting said first laterally adjustable guide in the space between the upper platen and the lower bed;

second support means mounting said second laterally adjustable guide in the space between the upper plate and the lower bed;

resilient means connected between one of said laterally adjustable guides and its respective support means to permit momentary lateral movement of that guide in response to width variations of the flexible strip;

a transverse guide at the input end of and spaced above the lower tool holder plate;

a second transverse guide at the output end of and spaced above the lower tool holder plate;

each of said transverse guides comprising a metal band secured at its ends under tension; and said transverse guides limiting vertical distortion of the strip as it moves between the tool holders.

2. The guide system of claim 1, wherein each of said laterally adjustable guides comprises:

a pair of superposed components, the lower one of said components being relatively thin with respect to the upper one of said components, the two components of each laterally adjustable guide including portions defining a space through which an edge portion of the strip passes.

3. The guiding system of claim 1, comprising:

first adjustment means for positioning said first laterally adjustable guide in relation to said first support means; and second adjustment means for positioning said second laterally adjustable guide in relation to said second support means.

4. The guide system of claim 3, comprising:

guide support connection means connecting said first and second laterally adjustable guides for mutual lateral movement.

5. The guide system of claim 4, wherein one of said guide support means includes:

a pair of guide supports spaced longitudinally along the respective guide; and individual guide support adjusting movements means for separate movement of each said guide supports.

6. The guide system of claim 5, comprising: means detachably mounting the individual guide support movement means on the bed.

7. A guiding system for a strip of flexible material passing through a machine which includes a work station having a lower bed and an upper platen which carry tool holder plates between which the strip is processed, said guiding system comprising:

first and second laterally spaced and laterally adjustable guides, each of said guides extending substantially the length of the platen in the direction of strip movement and each including a pair of superposed guide components, the lower ones of said components being relatively thin with respect to the upper ones of said components, said guide components including portions which define spaces for receiving respective edge portions of the moving strip; and first and second guide support means mounting said first and second guides respectively, between the platen and the bed, each of said support means including a pair of guide supports spaced longitudinally along the respective guide, adjustment means for positioning the respective guide in relation to its corresponding support means, and individual guide support movement means detachably mounted on the bed for separate movement of said guide supports.

8. A guiding system for a strip of flexible material, according to claim 7, wherein each of said adjustment means includes a threaded adjustment member having a shaped recess therein, and wherein each of said individual guide support movement means includes a spindle, a spindle support detachably mounted on the bed and supporting said spindle for rotation, and a shaped bar member carried by said spindle and received in said shaped recess for rotating said threaded adjustment member in response to rotation of said spindle.

9. A guiding system for a strip of flexible material, according to claim 8, wherein each of said spindle supports also supports the respective spindle for longitudinal movement, and wherein each of said individual guide support movement means further comprises a sleeve on said spindle, and a spring on said spindle bearing against said sleeve and said spindle support to urge said shaped bar member longitudinally toward said threaded adjustment member.

10. A guiding system for a strip of flexible material, according to claim 9, wherein each of said individual guide support movement means further comprises means in said spindle support for locking said spindle against rotation.

11. A guiding system for a strip of flexible material, according to claim 8, comprising first and second pairs of spaced holes in the bed, first and second pairs of spaced holes in respective ones of said spindle supports, and first and second pairs of dowels received in the holes of said bed and the holes of said spindle supports to locate and detachably mount said spindle supports to the bed.

* * * * *